Oct. 20, 1953  D. L. ALLOWAY  2,655,899
GANTRY AND GATES FOR STARTING RACE HORSES
Filed April 16, 1949  10 Sheets-Sheet 1

FIG-1

INVENTOR.
David L. Alloway
BY
Frank Kiefer
atty

INVENTOR.
David L. Alloway

Oct. 20, 1953 D. L. ALLOWAY 2,655,899
GANTRY AND GATES FOR STARTING RACE HORSES
Filed April 16, 1949 10 Sheets-Sheet 4

INVENTOR.
David L. Alloway
BY
Frank Keifer
atty.

Oct. 20, 1953  D. L. ALLOWAY  2,655,899
GANTRY AND GATES FOR STARTING RACE HORSES
Filed April 16, 1949  10 Sheets-Sheet 6

INVENTOR.
David L. Alloway

INVENTOR.
David L. Alloway
BY

INVENTOR.
David L. Alloway
BY
Frank Keifer

Patented Oct. 20, 1953

2,655,899

UNITED STATES PATENT OFFICE 2,655,899

GANTRY AND GATES FOR STARTING
RACE HORSES

David L. Alloway, Attica, N. Y., assignor of one-
half to Robert Weatherby, St. John's, New
Brunswick, Canada Application April 16, 1949, Serial No. 87,925

17 Claims. (Cl. 119—15.5)

Horse racing is a popular amusement. Horse races are held on tracks that are a half a mile or a mile in length as may be desired. Usually the track is a broad one and permits of six, eight, ten or more sulkies or jockeys and their horses to be started on the track abreast.

The object of this invention is to insure that the horses make an even start. That is, that the horses are abreast or nearly so so as to get the race fairly started.

Another object of the invention is to provide a trussed frame or bridge otherwise called a gantry that extends clear across the track and is high enough above the track to provide clear space thereunder so that the horses and the sulkies and the drivers or jockeys can pass under the gantry.

Another object of the invention is to provide swinging gates arranged in pairs of gates supported on the gantry, one pair of gates being alloted for each horse.

Another object of the invention is to release these pairs of gates simultaneously and swing and raise them so that the horses can run straight forward under the gantry.

Another object of the invention is to support the bridge at each end on rollers or wheels so that the bridge can run forward with the horses any distance that is desired.

Another object of the invention is to provide a track at each end of the bridge on which the bridge can run.

Another object of the invention is to support the source of power that drives the gantry at one end of the gantry, but to apply the power to both ends of the gantry from the middle of the gantry.

Another object of the invention is to provide means to simultaneously swing the gates on their upright axes and raise the gates at the same time.

Another object of the invention is to provide a deck or platform on which the starter can stand on the gantry and provide him with means for operating the gantry and controlling the starting of the horses.

In the drawings:

Figure 3 is an end view of the supporting frame or leg and track shown in Figure 1 looking at it from the left.

Figure 15A is an enlarged view showing a modified form of coupling that can be used for the purpose of joining the sections of the chords end to end.

In the several figures of the drawings, like reference numerals indicate like parts.

Figure 10:
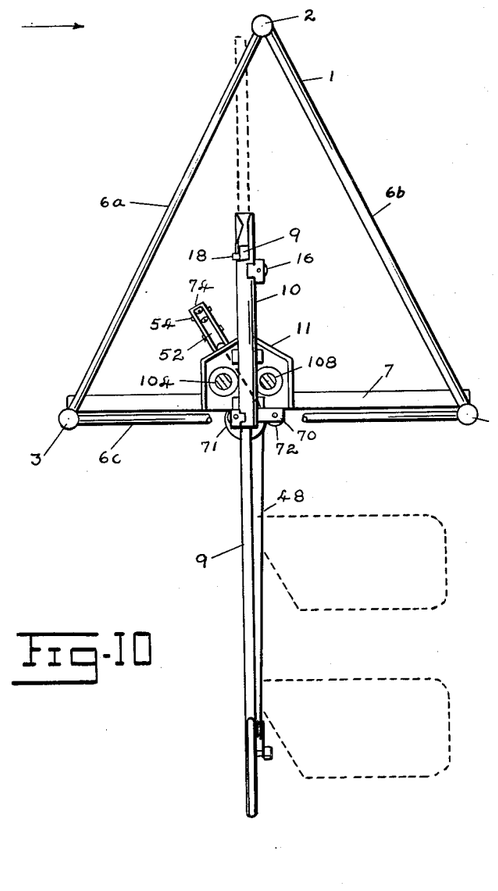
Figure 10 is a section on the line $10x$, $10x$ of Figure 7 showing the gantry frame and a gate and the support therefor.
Figures 19, 20:
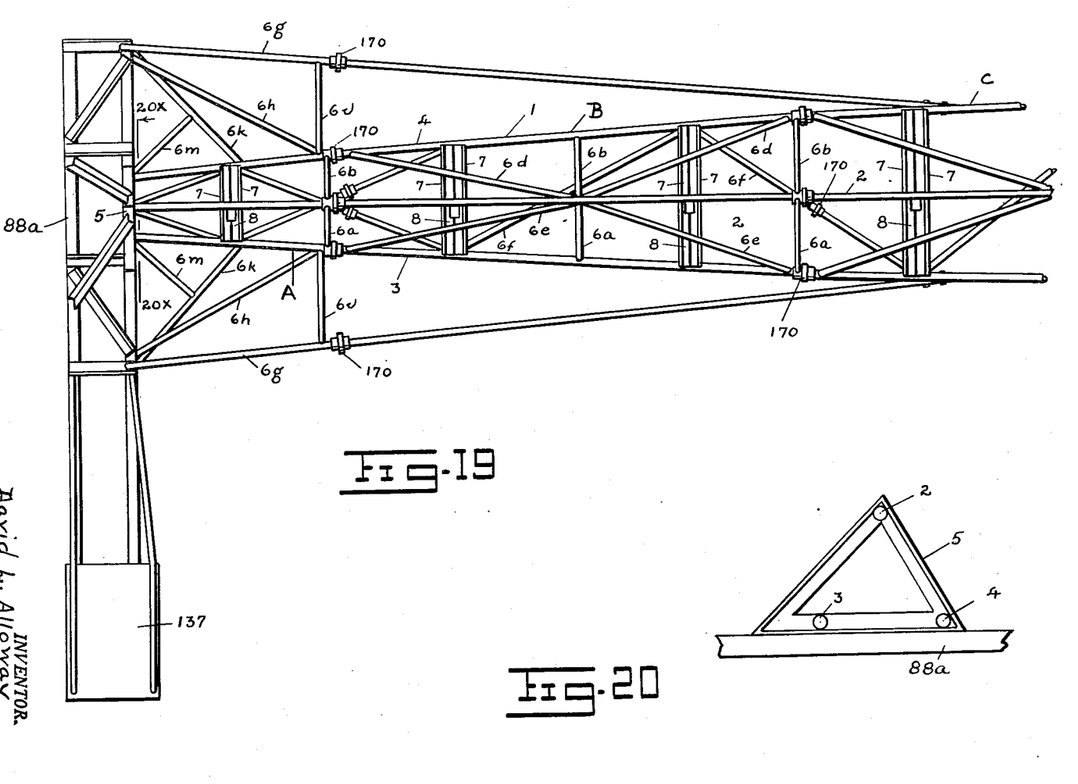
Figure 19 is a top plan view of the truss shown in Figure 1, together with the frame of the leg, all the working or moving parts of the truss being omitted.
Figure 20 is an enlarged cross section on the line 20x, 20x of Figure 19 showing how the three chords of the truss are placed at the end of the truss and enclosed in a triangular frame.

In the drawings reference numeral 1 indicates the truss or gantry. This gantry has a triangular cross section as is shown in Figure 10. This gantry comprises three tubular truss members or chords, each of which extends the full length thereof. Each of these members is curved corresponding to the shape of a bow, or the arc of a circle having a very long radius. The curve of each member may even be arbitrary. These three members are indicated by the reference numerals 2, 3 and 4. These three members are connected together at each end by a triangular frame 5, composed of angle irons or by a triangular plate having the edges of it bent to form flanges. The three long truss members are welded at each end to the triangular frame 5 or triangular plate above mentioned. Fig. 20.

At intermediate points the three chord members 2, 3 and 4 are connected together by two tubular inclined braces 6a and 6b and by the horizontal brace 6c. A pair of these braces is furnished for each pair of gates.

These three braces are of short length near the ends of the gantry and they increase in length toward the middle of the gantry, thus spacing the chord members 2, 3 and 4 further apart at the middle of the gantry and holding them closer together near the ends of the gantry.

In addition the chord members 3 and 4 are connected together at suitable intervals by two horizontal angle members 7 arranged in pairs. These angle members are suitably spaced apart with an open space of an inch or so between them forming a channel 8. These channels 8 are spaced apart five feet or thereabouts between centers.

The three chords 2, 3 and 4 are bow shaped and are held against skidding endwise on each other by diagonal braces 6d, which connects chords 2 and 4. Similar braces 6e are placed between chords 2 and 3 and similar braces 6f are placed horizontally between chords 3 and 4. These braces, where they make contact with the chords, are welded thereto so as to make the truss an integral structure.

The braces 6d, 6d where they join the upper and lower chords may be supplemented by small triangular plates or gussets 6t, 6t welded to the chords and braces. These appear in Figure 7.

Figure 4:
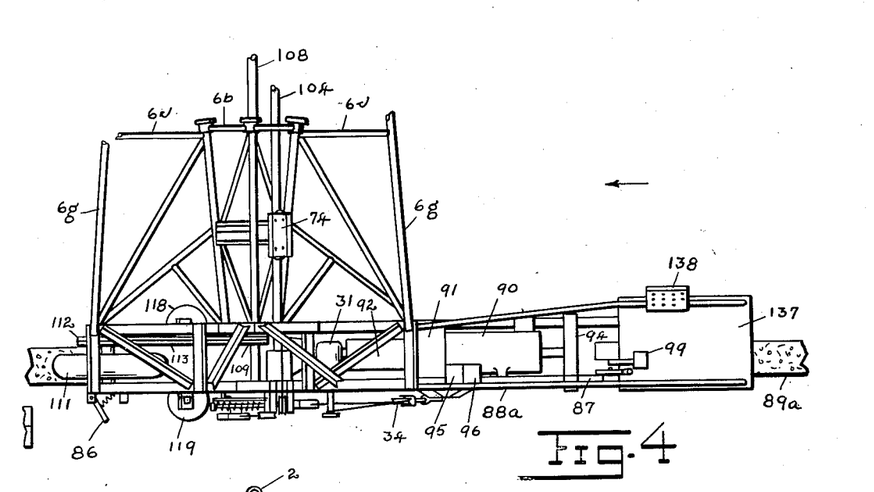
Figure 4 is a top plan view of Figure 3.

It will also be understood that the end of the gantry is braced against the end frame by horizontal braces 6g, 6g shown in Figures 4 and 19, which braces are on the same plane with the chords 3 and 4. The end frame is also braced against the chords 3 and 4 by the braces 6h, 6h. The chords 3 and 4 are braced against the braces 6g, 6g by the braces 6i, 6j. These braces are all on the same plane. The ends of the braces 6g, 6g will preferably be welded at one end to the angle irons that form part of the structure of the leg and at the other end will be fastened to the bottom chords 3 or 4 preferably by bolts.

It will also be understood that the braces 6g, 6g will be made in two parts connected together by couplings 170.

The chords 3 and 4 are braced against the end frame by the inclined braces 6k, 6k and these braces 6k, 6k are braced at the middle against the end frame by the inclined braces 6m, 6m.

At all places the braces are welded to their contacts except where bolting may be necessary to make a rigid structure.

It will also be understood that instead of three chords being used as is shown in Figure 10, four chords may be used, two of which chords may be used at the top suitably spaced apart and held together and these chords may be joined to the chords 3 and 4 by V-shaped braces similar to those already described. See Figures 21 and 22.

Each of these channels 8 supports a mechanism that supports, lifts and turns the shafts of a group of two gates except that at the two ends of the gantry, the channel 8 supports the mechanism for but one gate. The two shafts for a group of two gates are placed close together, being but an inch or two apart.

It will be understood that the gates are arranged in pairs, one pair of gates for each horse and the same number that is on the gate will be placed on the horse that must start through that gate. The pairs of gates are spaced apart five feet between centers.

In the drawings the pairs are numbered from I to XI inclusive, except that only the pairs numbered I, II, III, V, VI and XI are shown. The intermediate gates are not shown because they are carried by that part of the gantry that is broken away.

It will also be understood that each channel 8 supports not the two gates for one horse, but the left hand gate for one horse and the right hand gate for the next horse.

Figure 11:
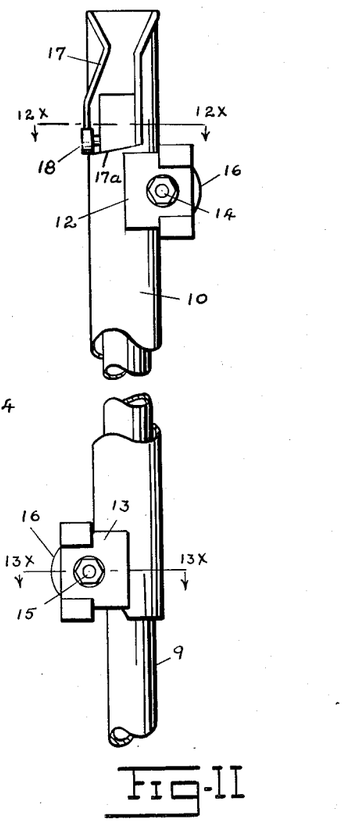
Figure 11 is a detail view of a portion of Figure 10 enlarged, showing the sleeve and the post for the gate that slides up and down in the sleeve and swings therein, the sleeve and the post being shown partly broken away.
Figure 12:
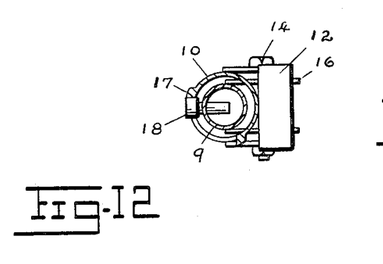
Figure 12 is a horizontal section on the line $12x$, $12x$ of Figure 11, looking down on it from above.
Figure 13:
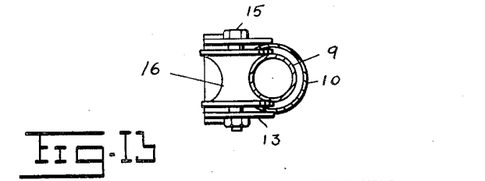
Figure 13 is a horizontal section taken on the line $13x$, $13x$ of Figure 11, looking down on it from above.

Each of these gates is supported by a shaft 9, which slides up and down and turns in a sleeve 10. (See Figure 11.) Each gate must not only lift, but it must swing away from the horse when all the horses are released for the race.

For this purpose two sleeves 10, 10a are supported on a bracket or housing 11. Each of these sleeves is provided with brackets 12 and 13. Each of these brackets has a bearing for a short shaft 14 and 15, which carry grooved rollers 16, 16. On these rollers the shaft 9 slides as the shaft moves up and down with the gate. The sleeve is about twenty-five inches long and the shaft that carries the gate is about seventy-one inches long.

At the top of the sleeve is carried a stationary cam 17 on which contacts a roller 18 carried near the top of the shaft 9. The reaction between the roller 18 and the cam 17 turns the gate very quickly when the shaft starts up. The travel of each shaft up and down is about thirty-six inches and they all move together as will presently be described. The gates are turned through 90° in the first six inches of the upward movement of the shaft that carries each gate. When the shafts come down they are turned back to the position shown in Figures 1 and 2 by the inclined track or cam 17a.

The upward and the turning movement of the shafts and gates will now be described. The pair of gates numbered I in Figure 1 and the group of two gates between the pair numbered I and II will be referred to, although it will be understood that what is said with regard to those particular gates applies to all of the pairs and groups or gates and the mechanism that operates them.

On the gantry are two master cables 25 and 26. The master cable 25 shown in Figures 1, 2, 6 and 8 travels to the right when the gates are drawn up. The master cable 26 is attached to the end gate 27, 27 in Figure 2, the end gate being part of the pair marked XI, that is the gate for the eleventh horse. This cable is drawn to the left of the mechanism shown in Figure 5. The right hand end of the cable is attached to the lever or tripping arm 28 pivoted at 29. The point of attachment to the lever is indicated at 30.

Figure 2:
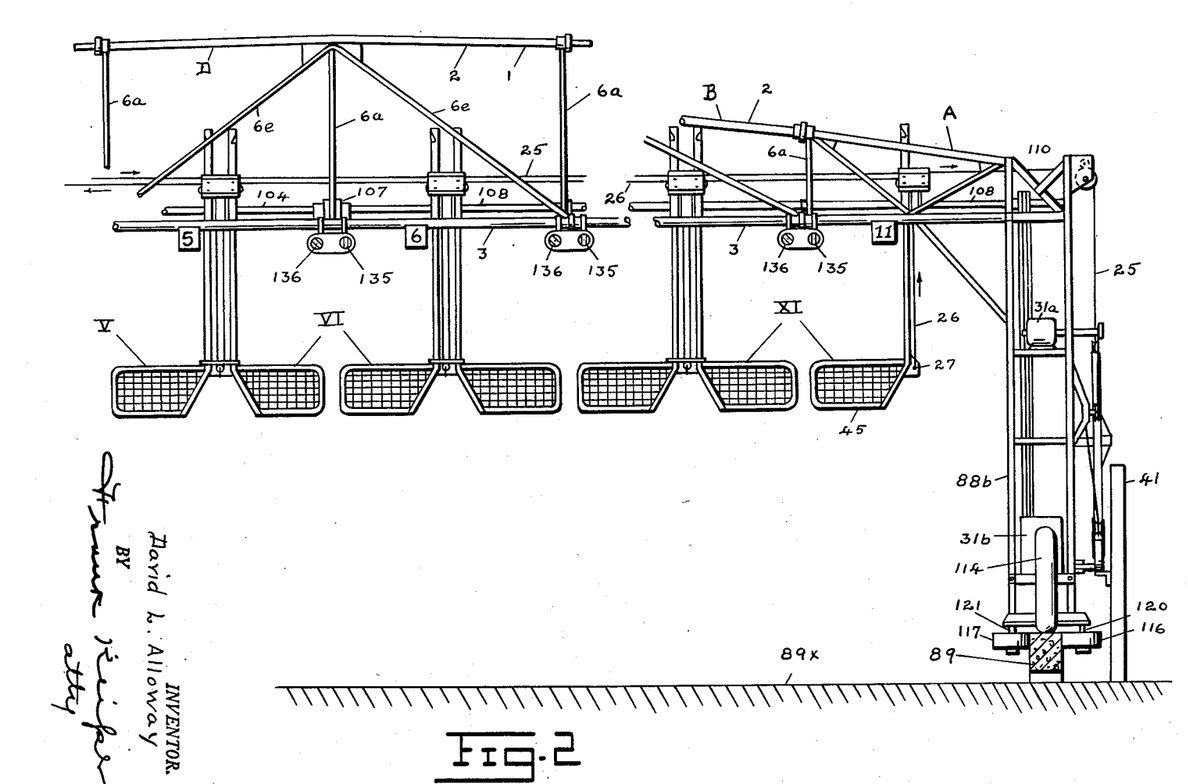
Figure 2 is a rear elevation of the right hand portion of the gantry partly broken away on the left with the supporting frame and track therefor.
Figure 5:
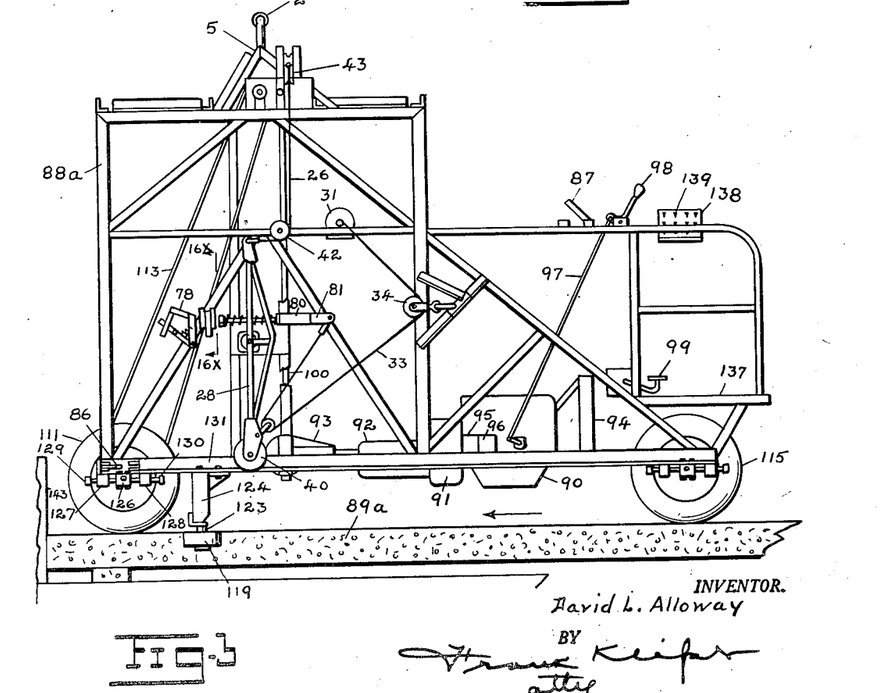
Figure 5 is a diagrammatic enlarged view of the tripping mechanism shown in Figure 3 and the stationary cam.

In Figure 5, 31 indicates a motor that turns a shaft 32 on which the short cable 33 is wound. This short cable passes over a pulley 34 and draws on a pulley 35. The free end of the cable 33 is anchored at 36. The pulley 35 is carried on a link 37 pivoted at 38 to a block 39 of the lever 28. On this block 39 is carried a roller 40 that rolls on the stationary cam 41 when the gantry is moved to the left as indicated by the arrow in Figure 5. Either the pull of the cable 33 or the roll of the roller on the cam 41 will move the lever 28 to the dotted line position shown in Figure 5 and draw the master cable 26. As the motor 31 turns the shaft 32 it winds up the cable 33 and draws the lever 28 to the dotted line position which is at right angles to the full line position shown in Figure 5. This in turn causes the upper end of the lever 28 to move down to the left to the dotted line position and pulls the cable 26 around the pulley 42 and around the pulley 43 pulling the cable 26 endwise to the left in Figure 8, lifting the end of it 27 shown at the right in Figure 6 and raising the end shaft and gate 45 shown at the right in Figure 2. At the right hand end of the gantry as shown in Figure 2 is a mechanism that is similar to that shown in Figure 5 that pulls on the master cable 25 and raises the end 46 which is attached to the end gate 47 at the left hand end of Figure 1.

Figure 17:
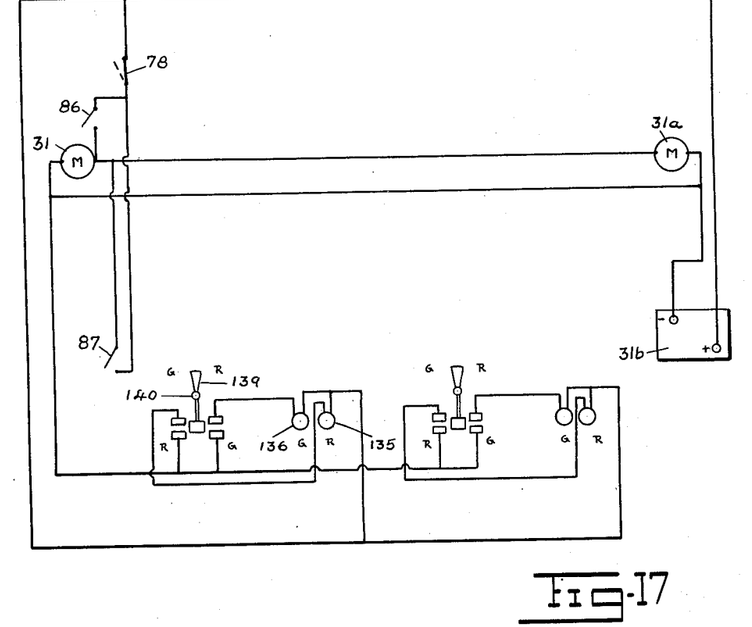
Figure 17 is a diagram of the electrical circuits and connections that control the movement of the gates and it also shows the lights used on two pair of gates.

At the right in Figure 17 is shown a motor 31a that pulls the master cable 25 just as the motor 31 pulls the master cable 26. Both of the motors 31 and 31a are driven from the storage battery 31b. The motors and the storage battery are carried on the legs 88a and 88b that will be described presently.

In this way the master cables directly raise the two end gates 45 and 47. At the same time the master cables lift each group of gates as will now be described.

At suitable intervals short auxiliary cables are attached at one end to one of these master cables and at the other end to the other master cable, there being one auxiliary cable for each group of gates, it being assumed that in this assembly there are eleven pairs of gates and there are therefore ten auxiliary cables, one for each group of gates.

The operation of each auxiliary cable in the lifting of each group of gates will now be explained. These ten auxiliary cables and the lifting mechanisms operated thereby for each group of gates are all alike; so that a description of one will answer for all of the rest.

Figure 6:
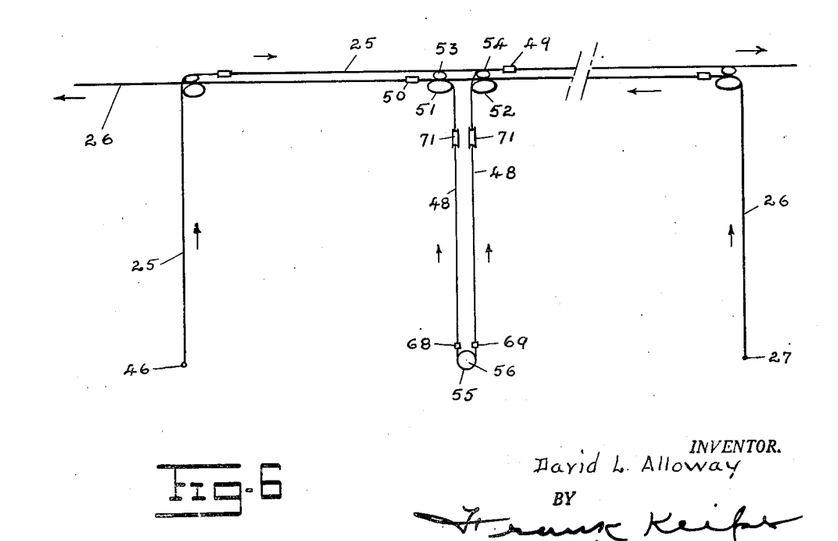
Figure 6 is a diagrammatic view of the cable mechanism that is used to raise all of the gates, the mechanism being shown partly broken away and viewed from the rear.

Figure 6 is a diagrammatic view showing the master cables 25 and 26. It also shows the auxiliary cable 48 attached to the shafts of the first group of gates at the left in Figure 1. This auxiliary cable is coupled to the master cable 25 at 49 and is coupled to the master cable 26 at 50. Pulleys are shown over which these master and auxiliary cables run, these pulleys being also shown in Figure 8 where the large pulleys 51 and 52 are shown supporting the two ends of the auxiliary cable and the master cable 26 and the two small pulleys 53 and 54 are shown supporting the master cable 25 and the right hand end of the auxiliary cable 48.

At the bottom the auxiliary cable makes a loop as indicated at 55. In this loop floats a pulley 56 carried on a shaft 57. From the ends of the shaft is a U-shaped hanger 58 through which passes a flexible link 59. This link is permanently attached at each end to the gates of one group. These gates as shown in Figure 7 are numbered 61 and 62.

Figures 7, 8, 9:
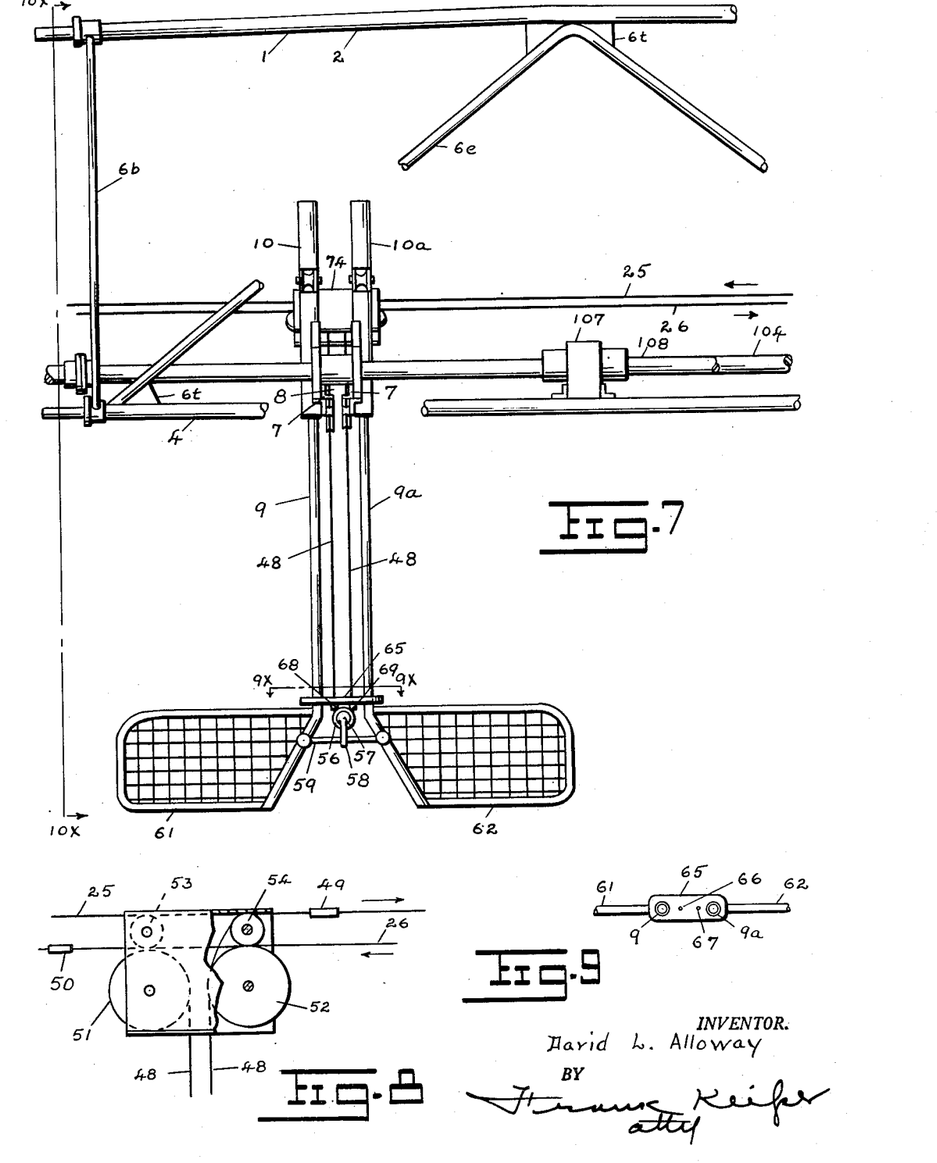
Figure 7 is an enlarged view showing an intermediate part of the gantry broken away at each end and two adjacent gates supported therefrom viewed from the front.
Figure 8 is a detail view of the pulleys and cables that elevate two adjacent gates shown in Figure 7, but viewed from the rear.
Figure 9 is a section on the line $9x$, $9x$ of Figure 7, looking down showing the spacer that holds the posts parallel to each other.

As the cables 25 and 26 move to the right and left respectively in Figures 6 and 8 they raise the pulley 56 in Figure 7 and this in turn pulls on the link 59 and pulls up the group of shafts 9 and 9a which slide in the sleeves 10 and 10a. As heretofore described each of these shafts 9 and 9a carries a roller 18 which reacts on the cam 17 and in the first six inches of the upward movement of the shafts 9 and 9a, turns them and their gates through 90°, bringing the outer ends of the gates together.

The shafts 9 and 9a are held together and spaced apart by the plate 65, which plate has openings therein to receive the two shafts. This plate has also two small openings therein 66 and 67 through which pass the two sides of the cable 48. On each side of the cable 48 is fastened a block 68, and 69 which is too big to run through the pulley 56 and the hanger 58. If either side of the cable breaks, the other side of the cable with the block will therefore run against the hanger and pulley, and raise the group of gates and shafts. Brackets 70, 70 are provided fastened to the underside of the angle 7, 7 of the channel 8. (See Fig. 10.) Each of these brackets carries a pulley 71 and a roller 72. The two sides of the cables 48, 48 pass over the pulleys 71 and are held in place therein by the rollers 72. Above the pulleys 71 the cables 48 change their direction at an angle shown in Figure 10 and one side of the cable passes in one direction over the pulleys 52 and 54 and the other side of the cable 48 passes in the opposite direction over the pulley 51.

The pulleys 51, 52, 53 and 54 are carried in the inclined bracket 74 which is shown in Figure 10 on the top of the housing 11. The bracket has to be offset and put on the inclination in order to avoid conflict with the sleeves 10 in which the shaft travels up and down.

The auxiliary cables 48 of each group of gates and shafts is connected to the master cables 25 and 26 in the same way as above described so that when the cables are pulled in opposite directions all of the shafts and their gates will move up together, and the gates will swing open.

The lever or tripping arm 28 shown in Figure 5 is moved from the full line position to the dotted line position by the motor 31, which turns and pulls on the cable 33, winding the cable around the shaft 32 as above described. When the lever 28 gets to the dotted line position, it strikes the pin 75 and pushes the arm 76 down and out of contact with the arm 77. These two arms 76 and 77 constitute an electrical switch 78 and when the arm 76 is pushed down it breaks the circuit of the current that drives the motor 31 and stops the pull of the motor on the cable 33.

In order to take up the inertia of the motor when the circuit is broken I provide as follows: When the lever 28 is in the dotted line position the cable 33 make a direct pull on the bar 79. This bar slides in a stationary sleeve 80. This bar has a head 81 on the right hand end thereof, which prevents it from moving to the left as shown in Figure 5. It has a collar 82 on the left hand end as shown in Figure 5. Between the collar 82 and the sleeve 80 a helical spring 83 is furnished. A hydraulic ram or snubber can be used in place of the helical spring to take up the recoil. When the cable 33 pulls the bar to the right in Figure 5 it compresses the spring and quickly brings the motor to a stop. It will be understood that the sleeve 80 is rigidly mounted on the end frame of the apparatus.

Figure 16:
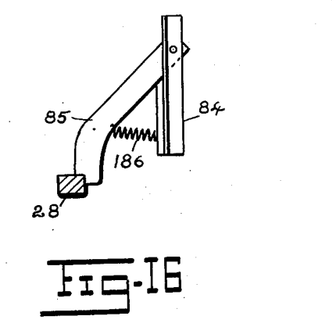
Figure 16 is a sectional view, the section being enlarged and taken on the line $16x$, $16x$ of Figure 3 showing the spring operated trip catch.

As shown in Figure 16, two angle brackets 84, 84 are rigidly mounted on the end frame of the apparatus. Between these is pivoted a pawl 85 pressed to the left in Figure 16 by the compression spring 186. The pawl rests on the lever 28 when it is in the horizontal or dotted line position of Figure 5. In this position the switch is open.

By pushing the pawl manually to the right in Figure 16 the lever 28 is released. As long as the lever 28 is in the horizontal position the cables 25 and 26 are holding the shafts 9, 9a and the gates up. As soon as the pawl 85 is pushed to the right by hand as shown in Figure 16 it releases the lever 28 and then the weight of the shafts and gates will cause them to move down and will pull the cables 25 and 26 back to their normal position and this in turn will pull the lever 28 to the full line position shown in Figure 5 and will unwind the cable 33 from the shaft 32 rotating the motor 31 backward idly in so doing.

The movement of the lever 28 from the dotted line position to the full line position will release the arm 76 of the switch 78 and the spring 78a will close the switch again and start the motor unless the operation of the motor is prevented in some other way. Referring to Figure 17, it will be seen that the switch 78 is in series with the two other switches 86 and 87. The switch 87 appears on Figure 3 of the drawing and is normally opened and is manually controlled and the switch 86 appears on Figures 3 and 4 of the drawing and is normally opened and is automatically closed by the forward movement of the gantry. This forward movement will now be described.

Figure 1:
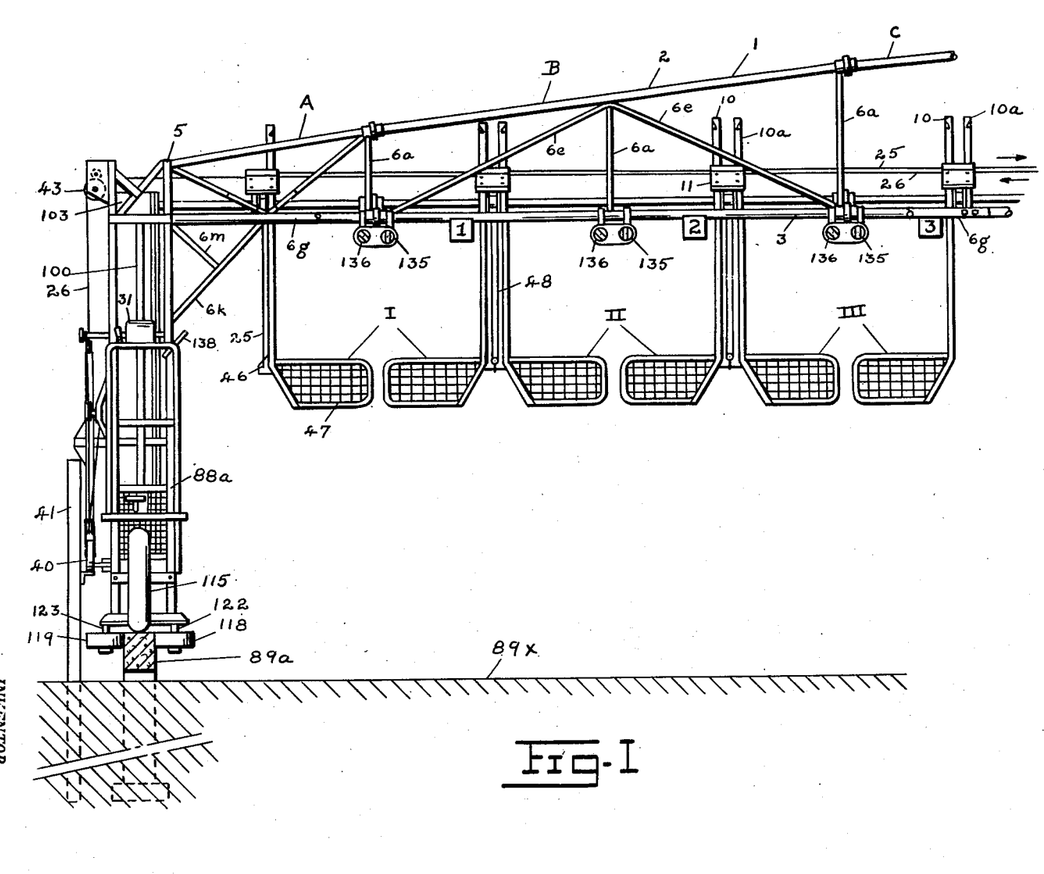
Figure 1 is a rear elevation of the left hand portion of the gantry partly broken away on the right with the supporting frame and track therefor.

At each end of the gantry is a leg shown in end elevation at the left of Figure 1 and at the right of Figure 2. The leg 88a at the left of Figure 1 is shown in side elevation in Figure 3 and is shown in top plan view in Figure 4. The leg 88b shown at the right in Figure 2 is substantially a duplicate of the leg at the other end of the gantry except that it does not contain the power mechanism that drives the whole assembly forward and back which power mechanism is carried in the leg 88a.

Figure 18:
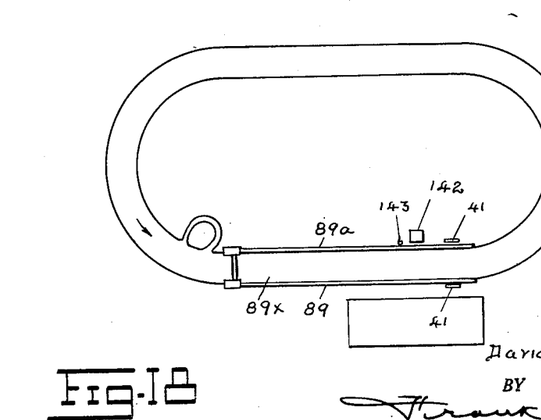
Figure 18 is a diagrammatic view of the oval race track and the tracks or runway on which the gantry runs and the grandstand.

On each side of the race track 89x is provided a special track or runway on which the gantry can be moved forward and back. This runway has two special tracks or rails, which are indicated in Figure 18 by the reference numerals 89 and 89a. The rail 89 is on the outside of this track as is shown at the right in Figure 2 and the rail 89a is on the inside of this track as is shown at the left in Figure 1 and at the left in Figure 4 and at the bottom in Figure 3. The power mechanism is shown in Figures 3 and 4 and is carried over the track 89a. This power mechanism comprises an internal combustion motor 90, a fluid drive mechanism 91, a transmission 92 and a rear end assembly 93, a radiator 94, a starter mechanism 95 and a battery 96. All these are duplicates of well-known mechanisms for automobiles.

It will be understood that the fluid drive mechanism is the equivalent of the clutch and gear transmission, permitting the motor to run with or without the gantry and also permitting a variable speed in the gantry. A hydromatic drive such as is in common use on automobiles can be used with equal success.

97 indicates a link that operates the butterfly valve of the carburetor which is operated by the lever 98.

99 indicates the foot lever that operates the hydraulic mechanism that applies the brakes on the four wheels, two of which wheels roll on the track 89a and two other wheels roll on the track 89. The power that applies the brakes is conveyed from the master cylinder by a tube that extends to the middle of the gantry.

At the middle of the gantry it connects with the tube that extends both ways and applies the pressure evenly to each of the cylinders of the four wheels. This is merely the same construction which is used on the conventional automobiles, or a brake drum such as is used on automobile wheels can be installed on the vertical drive shaft 100 shown in Figure 3 near the bottom of the drive shaft.

The power generated by the motor 90 drives the upright shaft 100. At the top of this shaft is the bevel gear 101 which drives the bevel gear 102 shown in Figure 14 and included in the housing 103 at the upper right hand corner of Figure 1. The bevel gear 102 drives the jack shaft 104 which in turn drives the spur gear 105. This spur gear in turn drives the spur gear 106. Both of these gears are included in the housing 107. This housing and the spur gears are on the center line of the gantry as appears in Figure 2.

The spur gear 106 is carried on the long shaft 108. The ends of this shaft are supported with bearings carried on the legs 88a and 88b. It is also supported by bearings at intermediate points, which bearings are located in the housings 11. Located in the narrow top of each leg on the long shaft 108 are sheaves 109 and 110. Each of these is a pulley having three grooves driving three belts. A similar pulley 112 of larger diameter is placed on the wheel 111 and its axle and is driven by the belts 113 from the sheave or pulley 109.

A similar pulley and belt drive arrangement is shown at the right in Figure 2 and drives the front wheel which is not shown in Figure 2, the wheel that is shown in Figure 2 being the rear wheel 114. The rear wheel 115 on the leg 88a is indicated at the right in Figure 3 and at the left in Figure 1. Sprocket gears and chains or direct drive by gears and shaft may be used instead of the belts and sheaves.

The reason for transmitting power from the short drive or jack shaft to the middle of the long line shaft through spur gears located at the center of the gantry is to cause the wheels in both legs to be driven evenly and without lagging on either side. If the power was applied to one end of the long line shaft, there would be a torque in the long line shaft which would cause the wheel at the far end of the shaft to lag behind the wheel at the near end of the shaft.

By applying the power to the middle of the long line shaft the torque of the shaft runs evenly from the center to the ends and drives both wheels evenly.

The wheels 111 to 115 roll on narrow tracks 89 and 89a. In order to keep these wheels centered on the narrow tracks, guide wheels are provided on each side of the track. These guide wheels 116 and 117 as shown at the right in Figure 2 and 118 and 119 as shown at the left in Figure 1 bear against the sides of the track 89 and 89a and rotate idly in contact therewith. They are carried on the short upright shafts 120, 121, 122, 123 which shafts are stationary. One of these shafts is shown at the lower left hand corner of Figure 3 and is supported from the U-shaped frame made of angle irons 124.

This frame supports both shafts 122 and 123. A similar frame supports the shafts 120 and 121. The three wheels 114, 115 and the wheel 111 and its companion wheel, not shown, are all standard automobile wheels equipped with pneumatic tires and hydraulic brake mechanism.

These four wheels support the legs of the gantry and the two front wheels 111 and its companion wheel not shown, are each accurately guided and held on the rail or tracks by the two guide wheels provided for each of the power driven wheels. The wheels 114 and 115 are trailing wheels and need not be guided specially.

Figure 14:
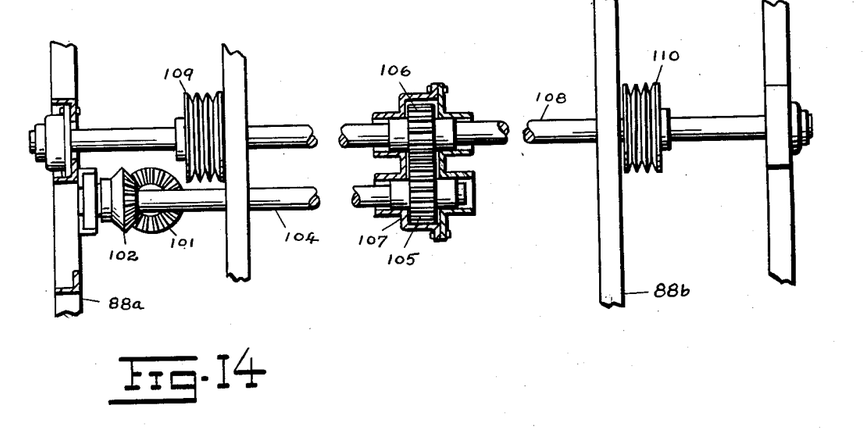
Figure 14 is an enlarged view showing the short horizontal power shaft and the long jack shaft parallel thereto.

The engine 90 is on the leg 88a at the left in Figure 14 and the guide wheels 116 and 117 on leg 88b at the right of Figure 14 may be omitted if the concrete track on that side is made wide.

The short shaft that carries each of the wheels 111–115 inclusive and the bearing that supports it is adjustable forward and back on each side as shown in Figure 3. At each end of the shaft is a bearing 126. On each side of the bearing is carried stationary lugs 127 and 128. In each of these lugs a bolt 129 and 130 is threaded. By turning the bolts, the bearing 126 is adjusted forward and back. The bearing 126 is supported from the frame 131 by two bolts. These bolts pass through slots in the frame 131 which permit the bearing 126 to move backward and forward. By the bolts the adjustment of the bearing is correctly made.

By adjusting the bearing on each side of the driving wheels, the driving wheels will be kept in perfect alignment and will run true on the track. The same adjustment is also provided on the two trailing wheels 114 and 115.

It will be understood that it is believed that the rail 89a under the motor alone may be used and the rail 89 may be omitted. In such case the track would be built up so that the wheels 114 and 115 would be on the same level.

The mechanism for driving the gantry forward is operated at a sufficient speed to bring the horses to the starting line in as near as possible an even line and at a speed that will be best suited for the starting of the race. At the proper moment at the starting line the gates will be opened and the horses will be released and the starter will say "Go" if the horses are on a line that is sufficiently even. After the gates have been opened and the horses and sulkies have passed through the speed of the gantry can be reduced and it can quickly be brought to a stop and returned to its starting point.

Referring to Figure 18 it will be understood that the horses run in the direction of the arrow; namely, from left to right and that the horses and gantry start with the horses on an even line as near as may be and run to the starting line at which time the gates may open. If the horses are in an irregular line the horses that are ahead must be held back and the horses that are behind must be urged forward until the line is even. This is done by the signal lights which are provided on each pair of gates. As shown in Figures 1 and 2 for each pair of gates a red light 135 is provided on the right and a green light 136 is provided on the left. These lights are operated by the starter who stands on a platform 137 shown in Figures 3 and 4. Above this platform is a panel 138 containing a series of switches 139 shown in detail in Figure 17. Each switch handle is carried on a pivot 140 and when moved to the left it will flash the green light on the gate and when moved to the right it will flash the red light on the gate. The red and green lights are indicated by the initial letters R and G in Figure 17. If a horse is lagging behind the starter will flash the green light on that pair of gates, indicating that that particular horse must come forward and if the horse is too close to the gates the starter will flash the red light indicating that that horse must be held back. Each driver or jockey must manage his horse to correspond with the lights on his gate. In this way the starter may hold back four of the horses and urge forward one of the horses until he gets them all in an even line and if they are on an even line at the starting line, then the starter closes the switch 87 and opens all the gates and says "Go."

If a horse goes wild and noses through the gates there is nothing to prevent the gates from swinging outward and letting the horse and the sulky or the horse and jockey pass through the gates.

In such case the gate will close behind the horse and to get the horse back of the gantry again, all of the gates must be lifted, and a new start must be made as above described in connection with Figure 18 with the gantry and the horses at the left hand end of the runway.

It will be understood that the judge's stand 142 is just beyond the starting line at which all the gates will be open and the tripping post 143 is placed at the starting line and the stationary cams 41 are placed on either side of the track beyond the judge's stand and the rollers 40 on the outside of each gantry leg will contact with the stationary cams 41 and swing the levers 28 and will raise the shafts and swing the gates if the electrical apparatus shown in Figure 5 has failed to do so.

Figure 15:
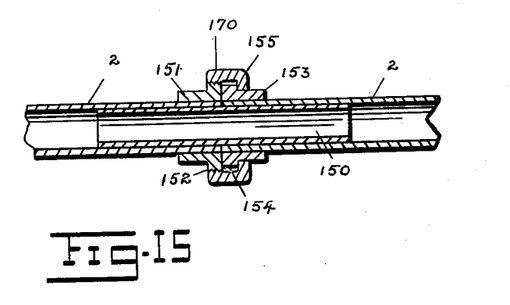
Figure 15 is an enlarged sectional view of two of the members of the truss and the coupling that connects them together.

In the Figure 15, I have shown a part of one of the chords in which two of the short members of the chords are joined together end to end, with braces, etc. omitted.

In the figure the separate members of chord number 2 are indicated. These members are each tubular. Inside of the tubular members is placed a sleeve 150, which makes a snug fit and holds the members of the chord 2 in alignment with each other. On the members of the chord 2 are placed the members of the coupling or union. This comprises a collar 151 having a threaded flange 152 thereon and a collar 153 having a flange 154. These two members are welded to the sections of the chord which carry them. Outside of these two members 151 and 153 is placed union nuts or coupling 155 having a female thread thereon which engages with the threaded flange 152 and it has also an inwardly extending flange which engages with the flange 154 on the member 153. By turning the union 155 the members 151 and 153 are drawn together, holding the two parts of the chords in line with each other.

In Figure 15A, I have shown a modification of the coupling. In this figure 2, 2 indicates the members of the chord. Into the open end of each of these members of the chord is welded a sleeve 156 and 157. On the outer end of each of these sleeves is a flange 158 and 159. Each of these flanges has a series of holes in it, preferably six holes in each flange and the two flanges are drawn together by bolts that pass through the flanges and by nuts that are carried on the bolts. A reinforcing and a lining sleeve 160 may be used on the inside of the sleeves 156 and 157.

The ends of the members that make up each chord shown in Figures 15 and 15A terminate at the outer ends of the diagonal braces 6d, 6d etc. so that the gantry may be taken apart and shipped in sections by opening the coupling members shown in either Figure 15 or 15A, it being understood that each section of the gantry will include the diagonal V braces shown in Figures 1 and 2. The braces referred to are shaped like an inverted V.

Figures 21, 22:
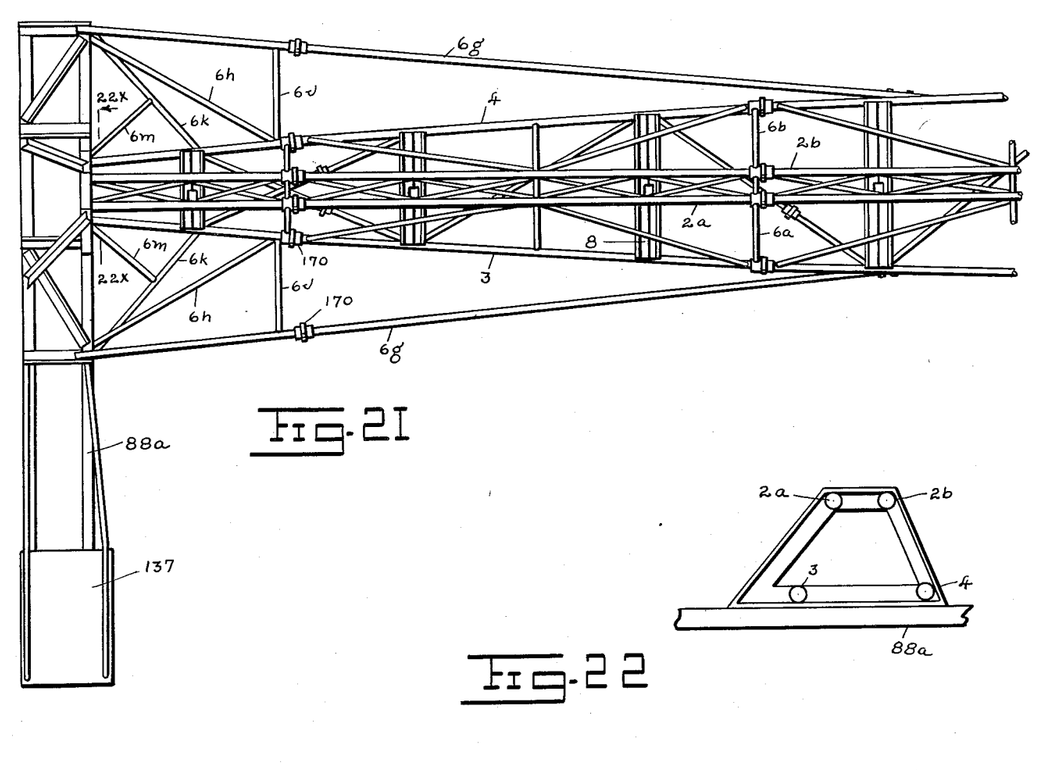
Figure 21 is a top plan view of the left hand end of a modified form of the truss in which four chords are used instead of three chords.
Figure 22 is an enlarged cross section on the line 22x, 22x of Figure 21 showing how the four chords are placed in an enclosing frame to which they are welded.

In Figures 21 and 22 I have shown a modified form of the truss in which four chords are used instead of three chords. In this type of truss the chords 3 and 4 are exactly the same as the truss shown in Figures 1 and 10. Two chords are used; namely, 2a and 2b.

The truss shown in Figure 21 has four sides instead of three and in the upright sides diagonal braces will be used similar to those used in Figures 1 and 10 and in both of the upright sides diagonal V-shaped braces will be used similar to those shown in Figures 1, 2 and 7. The chords 2a and 2b will be held apart and held together by braces in any suitable manner as shown in 21.

The operation of this device is as follows: Assuming that the parts are knocked down or disassembled the various sections of the gantry are coupled together and are coupled to the legs at each end. The legs are placed on the track with the gantry across the track. The internal combustion engine that drives the gantry shown in Figure 3 is started and the gantry is then ready to move forward or back on the runway. The horses are admitted on the track with their appropriate numbers and are directed to the stalls or gates in which they are entered. The gantry is then started down the track shown in Figure 17 running from left to right with the horses following the gantry. The starter signals such horses that are too far forward or too far behind as the gantry moves forward toward the starting line. It will be assumed that this approach to the starting line is about four-hundred feet and in this approach the horses can be started slow and accelerated as the gantry approaches the starting line. If the starter sees that the horses are substantially even or in line with each other he will then release the gates at the starting line and say "Go" and the race is on.

If a horse breaks through its gate by being out of control or otherwise or the horses have not formed an even line the gates will be lifted, but the starter will not say "Go," and a bell will be rung to notify the horses to come back. All the red lights can be flashed at once to indicate "no start."

If there is an even break the green lights can be flashed all together to indicate that there is a race and the starter will say "Go." The starter will raise the gates by the controls heretofore described or the gates will be raised by the tripping device 143 indicated in Figures 3 and 18 and if either of these fails to open the gates, the gates will be opened by the stationary cam 41, 41 shown in Figures 5 and 18.

The gantry may be equipped with a broadcasting system so that the starter can give instructions to the individual drivers or jockeys and the instructions can be amplified so that the spectators in the grand stand can hear what he is saying, all of which adds to the interest of the race. Difference of opinion makes horse races, but these details will help.

Referring again to the structure of the truss, which is partly shown in top plan view in Figure 4 an extension of the truss is shown in Figure 19 in top plan view. This truss comprises the three chord members 2, 3 and 4 shown in cross section in Figure 20. The use of this gantry will not be confined to a single track. It may be used on a dozen or more tracks in a year, but in order to simplify or make possible the transportation of it, I have made the truss so that it can be taken apart and divided into sections the longest of which sections might be as much as twelve feet in length or even longer as might be desired.

For this purpose I make my truss in sections and provide couplings for joining the sections together, such as are shown in Figures 15 and 15A so as to make each section a solid permanent movable unit that can be loaded on a truck and can be erected and taken down as a unit where the gantry is to be used.

In Figure 1 I have shown the structure of the leg and sections A, B and part of section C of the truss. At the right hand end of section A the three chords are spaced apart and held together by the braces 6a, and 6b and 6c shown in Figure 10. These braces are shown welded to one member of the coupling 170 or they can be welded direct to the chords 2, 3 and 4 if desired. In section B, similar braces are welded to the couplings at the right hand end, and the left hand end of the chords left free from braces so that they can be sprung slightly so as to bring the parts of the couplings together which is necessary in the erection of the truss. When the couplings are securely joined, the braces 6a, 6b and 6c at the right hand end of section A will also serve as braces for the chords at the left hand end of section B and in like manner when section B is joined to section C, the braces 6a, 6b and 6c will serve as braces for the chords at the left hand end of section C.

Assuming that the left hand end of the truss is shown in Figures 1 and 19, the sections of the truss at the right hand end of the truss will be constructed and assembled in a similar manner as above described, the part being reversed from left to right as may be needed.

Section C will be built like section B except that there will be no end braces 6a, 6b and 6c such as is shown in Figure 10.

Section D is shown in Figure 2 and will be the center unit. The center unit will be provided at each end with the center braces 6a, 6b and 6c shown in Figure 10 and the ends of section C on the right and left of section D will be coupled to it in the manner illustrated and described above.

This will make a gantry seven sections long, which gantry will have sections A, B and C on its left end and sections C, B and A on its right hand end. This provides for eleven pairs of gates. By omitting the two sections C and reconstructing section D to correspond, the gantry would provide for seven pairs of gates.

It will also be understood that any brace that crosses a joint between the sections A, B, C etc. will have to be divided at the joint and the ends thereof will be connected by couplings as above described and as shown in Figures 15 and 15A.

It will also be understood that it is not necessary to build the truss so that two groups of gates will be provided for each of the sections B, C and D but the groups of gates can be distributed among the sections so as to give the desired result in the number of gates as compared with the truss.

In Figures 21 and 22, the truss is shown made of four chords, each of which is bow shaped. These chords are held together on each end by being welded into a frame of angle iron, having four sides, such as is shown in Figure 22. This frame I on either end is welded to the top of the frame of the leg.

I claim:

1. In a gantry for starting race horses on a race track, a combination of two parallel runways with a race track between them, a leg having supporting wheels running on each runway, an overhead truss connecting the two legs, power driving means operatively associated with said gantry including a common power source connected to wheels of each of said legs through like gearing for driving the two legs and truss evenly on the two runways, a series of gates arranged in pairs depending from said truss, upright shafts associated with the truss on which said gates are carried and means carried by the gantry for axially moving and simultaneously rotating said shafts to raise and open said gates.

2. In a gantry for starting race horses on a race track, a combination of two parallel runways with a race track between them, a leg having supporting wheels running on each runway, an overhead truss connecting the two legs, power driving means operatively associated with said gantry including a common power source connected to the wheels of each of said legs through like gearing for driving the two legs and truss evenly on the two runways, a series of gates arranged in pairs depending from said truss and swinging on vertical axes, upright shafts associated with said truss on which said gates are carried, means carried by the truss for simultaneously raising and opening each pair of gates each of said gates swinging on its respective vertical axis at all times during the raising thereof.

3. In a gantry for starting race horses on a race track, a combination of two parallel runways with a race track between them, a wheeled leg on each runway, an overhead truss extending across the race track and connecting the two legs, driving means on the legs and truss for said wheeled legs including a common power source and like gearing extending from said truss to each wheeled leg for driving the two legs and truss evenly on the two runways.

4. In a gantry an overhead truss, a series of gates arranged in symmetrical pairs depending from said truss, means carried by said truss for pivotally mounting each gate of each pair for swinging on a fixed vertical axis means carried by the truss for raising and swinging open simultaneously and symmetrically each pair of gates.

5. In a gantry an overhead truss, a series of gates arranged in symmetrical pairs depending from said truss, means carried by said truss for pivotally mounting each gate of each pair for swinging on a fixed vertical axis means carried by the truss for raising and swinging open simultaneously and symmetrically each pair of gates, means for lowering and swinging shut simultaneously said pairs of gates.

6. In a gantry for starting race horses on a race track, a combination of two parallel runways with a race track between them, a leg having supporting wheels running on each runway, a truss connecting said legs, said runway having exposed sides, guide wheels carried on upright shafts and bearing on each side of the runway to hold the supporting wheels in line on said runway and means carried by the truss for driving the supporting wheels of the respective legs in unison.

7. In a gantry for starting race horses on a race track, a combination of an overhead truss, travelling end supports for said truss, a series of shafts and gates arranged in pairs arranged along the length of the truss depending from said truss, two master cables, one extending from one end support along the truss to the furthest gate and the other extending from the other end support along the truss to the furthest gate, an auxiliary cable attached at one end to one of these master cables and attached at the other end to the other master cable, said auxiliary cable being attached to the adjacent shafts of the adjacent gates of two adjacent pairs and being adapted to lift the adjacent shafts and gates when one of the master cables is pulled in one direction and being adapted to lift the adjacent shafts and gates when the other master cable is pulled in the opposite direction.

8. In a gantry for starting race horses, a combination of a series of gates arranged in pairs, a truss for supporting said gates, a leg at each end of the truss, supporting the truss, two master cables supported on the truss and running the length thereof, mechanism on one leg for drawing one end of the cable in a direction lengthwise of the truss and mechanism on the other leg for drawing the other cable in the opposite direction, the opposite end of the one cable being attached to and used to lift the end gate on the opposite end of the truss from the first named leg and the opposite end of the other cable being attached to and used to lift the end gate on the opposite end of the truss from the other leg.

9. In a gantry for starting race horses, a combination of a series of gates arranged in pairs, a truss for supporting the gates, two master cables supported on the truss and running the length thereof, mechanism on one leg for drawing one cable in a direction lengthwise of the truss and mechanism on the other leg for drawing the other cable in the opposite direction and an auxiliary cable for the adjacent gates of adjacent pairs of gates, one end of each auxiliary cable being attached to the one master cable and the other end of each auxiliary cable being attached to the other master cable, an upright shaft for each gate, a sleeve carried by said truss in which said shaft is supported and in which it slides up and down, said auxiliary cable being looped downwardly between and being engaged with the upright supporting shafts for the said adjacent gates and being adapted on the endwise movement of the master cables in one direction to lift the gates and being adapted on the endwise movement of the master cables in the other direction to let the gates drop down.

10. In a gantry for starting race horses, a combination of a truss, a series of gates arranged in pairs supported by said truss, two parallel master cables supported on the truss and running the length thereof, means carried by the gantry for drawing one cable in a direction lengthwise of the truss and means carried by the gantry for drawing the other cable in the opposite direction, an auxiliary cable on the adjacent gates of adjacent pairs of gates, one end of each auxiliary cable being attached to the one master cable and the other end of each auxiliary cable being attached to the other master cable, an upright shaft for each gate of each group, a sleeve mounted on said truss in which said shaft is supported and in which it slides up and down, said auxiliary cable extending down and up between the upright supporting shafts for said adjacent gates and attached thereto and being adapted on the endwise movement of the master cables in their first directions to lift the gates and being adapted on the endwise movement of the master cables in their reverse directions to let the gates drop down.

11. In a traveling gantry, the combination of a truss mounted for movement on a track, a series of gates supported from said truss, auxiliary cables associated with the truss for moving said gates from closed to open position, a master cable associated with the auxiliary cables for moving the auxiliary cables, a lever of the first class mounted on the truss at one end to which lever at one end the master cable is attached, power means carried by the truss for actuating said lever, and stationary cam means operatively associated with said lever adapted to actuate said lever by movement of said truss along said track.

12. In combination a gantry mounted for movement on a track and comprising a truss, a series of gates supported from said truss, auxiliary cables associated with the truss for moving said gates from closed to open position, a master cable associated with the auxiliary extending lengthwise of the truss for moving the auxiliary cables, a lever of the first class mounted on the gantry to one end of which lever the master cable is attached, a short cable connected to the other end of said lever, a motor mounted on the gantry operating to draw said short cable to swing said lever and pull the master cable, a roller also mounted on the same other end of said lever, a stationary cam along said track with which said roller contacts to swing the lever on the movement of said gantry along the track.

13. In combination a gantry comprising a truss, a series of gates supported from said truss, auxiliary cables associated with the truss for moving said gates from closed to open position, a master cable associated with the auxiliary cables and extending lengthwise of the truss for moving the auxiliary cables, a lever of the first class mounted on the gantry to one end of which lever the master cable is attached, a short cable connected to the other end of said lever, a motor mounted on said gantry operating to draw said short cable to swing said lever and pull the master cable.

14. In combination a gantry mounted for movement on a track and comprising a truss, a series of gates supported from said truss, auxiliary cables associated with the truss for moving said gates from closed to open position, a master cable associated with the auxiliary cables and extending lengthwise of the truss for moving the auxiliary cables, a lever of the first class mounted on the gantry to one end of which lever the master cable is attached, a roller mounted on the other end of said lever, a stationary cam along said track with which said roller contacts to swing the lever on the forward movement of the gantry along the track.

15. In a gantry, an overhead truss, a series of gates arranged in symmetrical pairs depending from said truss and having vertical rotatable bars, and means associated with the truss for oppositely rotating the bars of each pair and simultaneously axially moving said bars upwardly.

16. In a gantry, an overhead truss, a series of gates depending therefrom arranged in substantially symmetrical pairs, means carried by said truss for supporting said gates for opposite rotation, and means for causing the gates of each pair to open in opposed upward substantially helical motion.

17. In a race starting gantry, a truss, a plurality of pairs of gates having rotatable support bars depending from said truss, means associated with the truss for raising said support bars by substantially axial movement simultaneously, and means cooperating therewith for rotating pairs of said bars oppositely on initial upward movement, whereby to open said gates, and thereafter lift the gates clear.

DAVID L. ALLOWAY.

References Cited in the file of this patent

UNITED STATES PATENTS

| Number | Name | Date |
|---|---|---|
| 284,824 | Davis | Sept. 11, 1883 |
| 596,023 | Barrett | Dec. 21, 1897 |
| 825,018 | Davis | July 3, 1906 |
| 1,031,091 | Scaramucci | July 2, 1912 |
| 1,815,757 | Bahr | July 21, 1931 |
| 1,832,780 | Juron | Nov. 17, 1931 |
| 2,273,493 | McMillan | Feb. 17, 1942 |
| 2,507,994 | Pierce | May 16, 1950 |